(12) United States Patent
Tong

(10) Patent No.: US 7,711,881 B2
(45) Date of Patent: May 4, 2010

(54) METHOD FOR RESTORING SYSTEM CONFIGURATION INFORMATION OF A NETWORK ATTACHED STORAGE

(75) Inventor: Mo-Ying Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 136 days.

(21) Appl. No.: 11/944,422

(22) Filed: Nov. 22, 2007

(65) Prior Publication Data
US 2008/0147948 A1     Jun. 19, 2008

(30) Foreign Application Priority Data
Dec. 15, 2006   (CN) .................. 2006 1 0157544

(51) Int. Cl.
G06F 13/24   (2006.01)
G06F 3/00    (2006.01)
G06F 11/00   (2006.01)

(52) U.S. Cl. .................. 710/260; 710/10; 710/266; 714/2

(58) Field of Classification Search .............. 710/8, 710/10, 104, 260, 266; 709/203, 211, 212, 709/216, 217, 219, 221; 714/6, 23, 2; 713/100
See application file for complete search history.

(56) References Cited

U.S. PATENT DOCUMENTS 6,438,684 B1 * 8/2002 Mitchell et al. ................. 713/1
6,496,858 B1 * 12/2002 Frailong et al. ............. 709/221
6,751,681 B2   6/2004 Torii et al.
7,310,704 B1 * 12/2007 Wen et al. .................... 711/114
2003/0037120 A1 * 2/2003 Rollins ....................... 709/217
2003/0140132 A1 * 7/2003 Champagne et al. ........ 709/223
2005/0034122 A1 * 2/2005 Kung et al. .................. 717/177
2007/0260717 A1 * 11/2007 Kano .......................... 709/223
2008/0117920 A1 * 5/2008 Tucker ........................ 370/401

OTHER PUBLICATIONS

"The Free On-Line Dictionary of Computing". Entry 'stack'. Online Apr. 10, 1995. Retrieved from Internet Aug. 5, 2009. <http://foldoc.org/stack>.*

* cited by examiner

Primary Examiner—Thomas J Cleary
(74) Attorney, Agent, or Firm—Frank R. Niranjan

(57) ABSTRACT

A method for restoring system configuration information of a network attached storage includes the steps of: setting system configuration information of an network attached storage as a backup file; registering an interrupt handler; pressing down an input key (16) to turn off a power switch (K1) and generate an interrupt signal; invoking the interrupt handler to process the interrupt signal and returning interrupt GPIO information; determining whether an operating system receives the interrupt GPIO information from the interrupt handler; sending a periodical voltage to a second pin (P2) for blinking a LED (L1) if the operating system receives the interrupt GPIO information from the interrupt handler; invoking the backup file to restore the system configuration information of the network attached storage; and sending a high voltage command to the second pin for powering off the LED, which indicates that the system configuration information has been restored.

4 Claims, 6 Drawing Sheets

METHOD FOR RESTORING SYSTEM CONFIGURATION INFORMATION OF A NETWORK ATTACHED STORAGE

BACKGROUND OF THE INVENTION

1. Field of the Invention

The present invention generally related to methods for restoring system configuration information of a network attached storage.

2. Description of Related Art

Most network attached storage (NAS) devices are embedded systems. NAS generally refers to a data storage element or device that is connected to a network allowing access to computers on the network, thus providing more storage space for users.

The NAS often resides in a machine that is expected to run continuously for years without errors. Therefore software for NAS is usually tested more thoroughly than general purpose operating systems or applications software. When systems errors or other critical errors occur in the NAS, system configuration information of the NAS may be destroyed or altered. The current method for restoring the NAS is to reload new system configuration information on a Flash ROM of the NAS. However, the current method for restoring the NAS has disadvantages, such as some data of the original system configuration information are lost because the new system configuration information is not the same as the original system configuration information.

What is needed is a method for restoring a network attached storage, which can restore system configuration information of the NAS.

SUMMARY OF THE INVENTION

One preferred embodiment provides a method for restoring a network attached storage. The network attached storage includes a general purpose input/output (GPIO) device, the GPIO device comprises a first pin, a power switch, a light emitting diode (LED) and a second pin connected in turn. The method includes the steps of: setting system configuration information of the network attached storage as a backup file; registering an interrupt handler; pressing down an input key connected to the power switch to turn off the power switch and generate an interrupt signal in the first pin; invoking the interrupt handler to process the interrupt signal and returning interrupt GPIO information; determining whether an operating system of the network attached storage receives the interrupt GPIO information from the interrupt handler; sending a periodical voltage to the second pin for blinking the LED if the operating system receives the interrupt GPIO information from the interrupt handler; invoking the backup file to restore the system configuration information of the network attached storage; and sending a high voltage command to the second pin for powering off the LED, which indicates that the system configuration information has been restored.

Other systems, methods, features, and advantages will be or become apparent to one skilled in the art upon examination of the following drawings and detailed description.

DETAILED DESCRIPTION OF THE INVENTION

Figure 1:
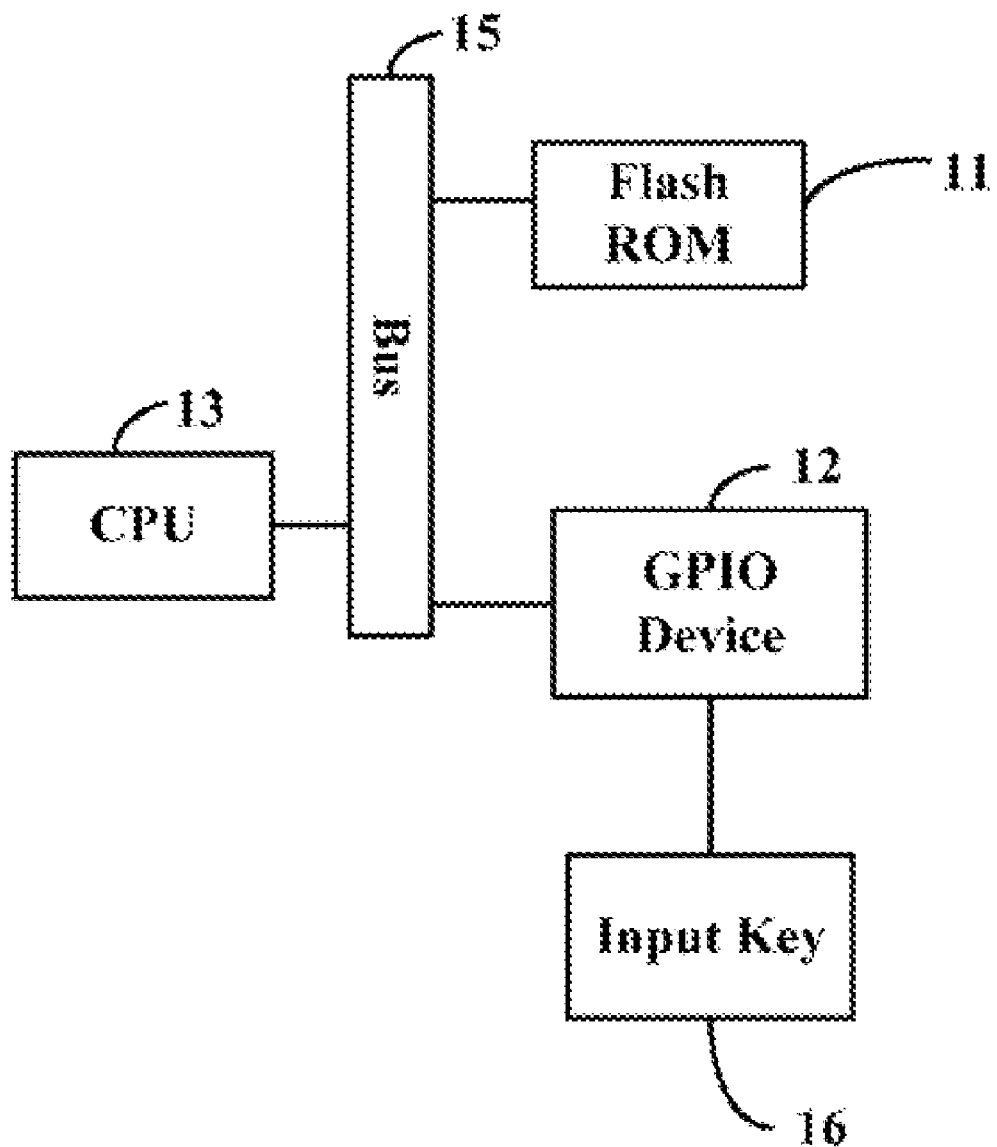
FIG. 1 is a block diagram of a network attached storage in accordance with one preferred embodiment.

FIG. 1 is a block diagram of a network attached storage (NAS) in accordance with one preferred embodiment. The NAS typically includes a Flash-ROM 11, a general purpose input/output (GPIO) device 12, a central processing unit (CPU) 13, a bus 15, and an input key 16 connected to the GPIO device 12. The Flash-ROM 11, the GPIO device 12, and the CPU 13 are connected to the bus 15. An operating system and a backup file are stored in different partitions of the Flash-ROM 14.

Figure 2:
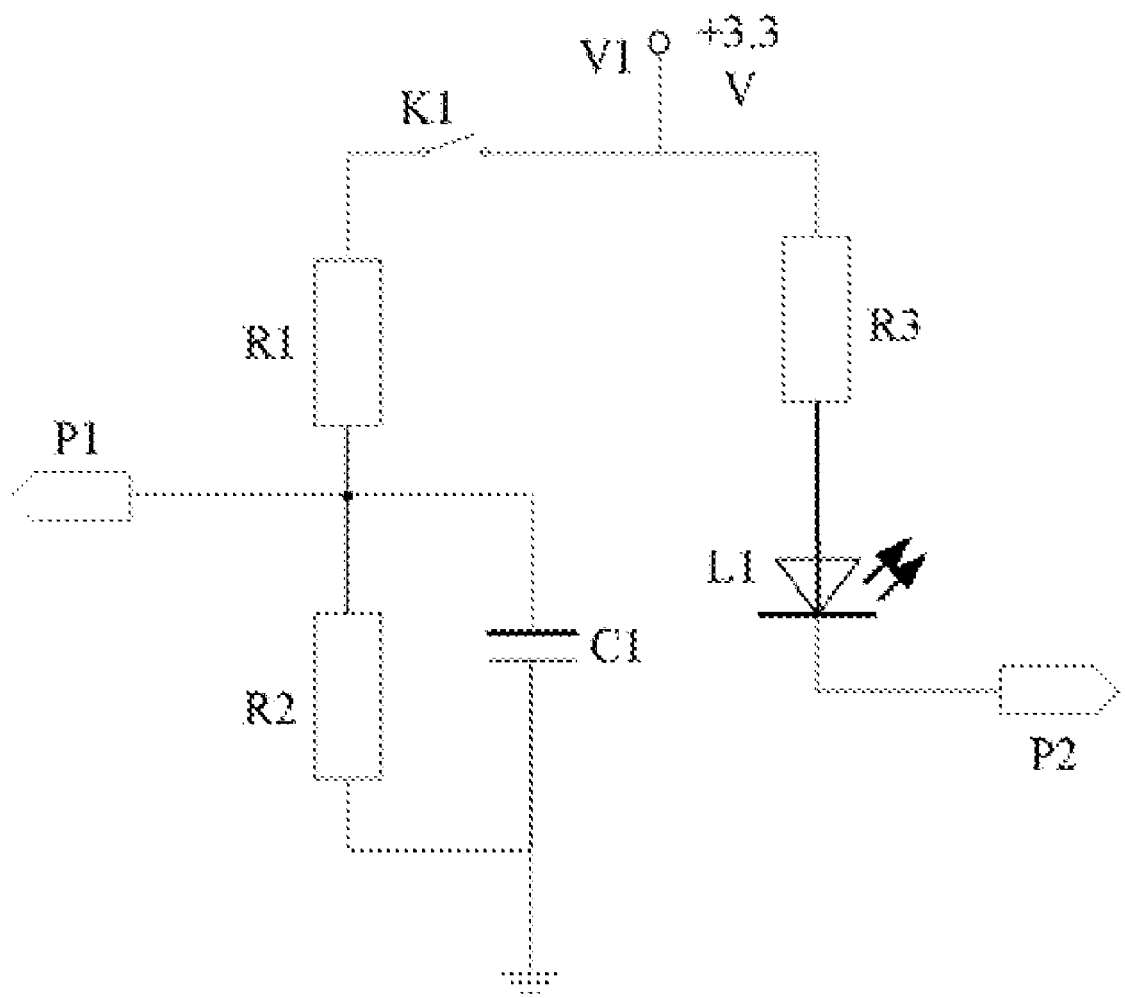
FIG. 2 is a circuit diagram of part of a GPIO device in FIG. 1.

FIG. 2 is a circuit diagram of part of the GPIO device 12 in FIG. 1. The circuit diagram typically includes a power switch K1, a first resistance R1, a second resistance R2, a third resistance R3, a capacitance C1, a light emitting diode (LED) L1, a first pin P1, a second pin P2, and a node V1 that is connected to 3.3 volts power supply. The first pin P1, the first resistance R1, the switch K1 which is further connected with the input key 16, the third resistance R3, the LED L1, and the second pin P2 are connected in the order written. The anode of the LED L1 is connected with the third resistance R3, and the cathode of the LED L1 is connected with the second pin P2. The second resistance R2 is connected parallel with the capacitance C1, one end of the parallel connection is connected to the end between the first pin P1 and the first resistance R1, the other end of the parallel connection is connected to the ground. The anode of the capacitance C1 is connected with the end between the first pin P1 and the first resistance R1, and the cathode of the capacitance C1 is connected to the ground. The node V1 is connected between the switch K1 and the third resistance R3. Once the input key 16 is pressed down, the switch K1 is closed to complete the circuit therein, which generates a 3.3 volts high voltage in the first pin P1, thus, generating a hardware interrupt. Once a high voltage is sent to the second pin P2, the LED L1 is powering off. Once a low voltage is sent to the second pin P2, the LED L1 is luminescing. Once a periodical voltage is sent to the second pin P2, the LED L1 is blinking.

Figure 3:
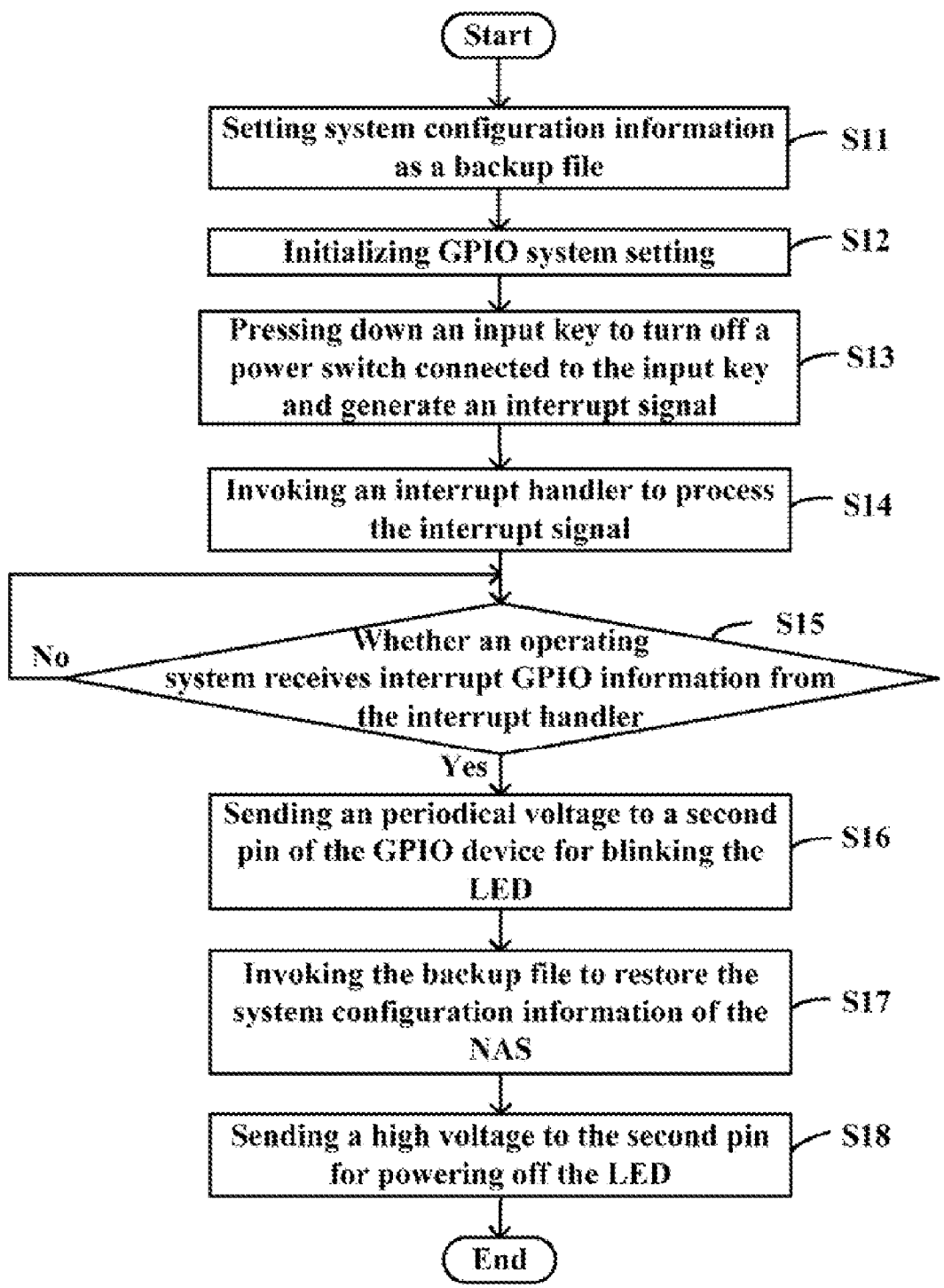
FIG. 3 is a flowchart of a method for restoring system configuration information of a network attached storage in accordance with one preferred embodiment.

FIG. 3 is a flowchart of a method for restoring system configuration information of a NAS in accordance with one preferred embodiment. The method of steps S11, S12 and S14 are performed on the kernel layer of the NAS. The method of steps S15, S16, S17 and S18 are performed on the application layer of the NAS.

In step S11, system configuration information of the NAS is set as a backup file in the Flash-ROM 14. The system configuration information includes startup information, user information, and start services of restoring the NAS.

In step S12, GPIO system setting is initialized. The details of initializing GPIO system setting are described in FIG. 4.

In step S13, when the system configuration of the NAS is destroyed, the input key 16 is pressed down to turn off the power switch K1 and generate a hardware interrupt and an interrupt signal.

In step S14, the interrupt handler is invoked to process the interrupt signal. The details of processing the interrupt signal by the interrupt handler are described in FIG. 5 and FIG. 6.

In step S15, it is to determine whether the operating system receives interrupt GPIO information sent from the interrupt handler.

In step S16, if the operating system receives the interrupt GPIO information from the interrupt handler, a periodical voltage is sent to the second pin P2 of the GPIO device 12 for blinking the LED, which indicates that the system configuration information is in a restoring state.

In step S17, the backup file is invoked to restore the system configuration information of the NAS.

In step S18, a high voltage is sent to the second pin P2 for powering off the LED L1, which indicates that the system configuration information has been restored.

In the step S15, if the operating system hasn't received the interrupt GPIO information from the interrupt handler, repeat step S15 to determining whether the operating system receives interrupt GPIO information sent from the interrupt handler.

Figure 4:
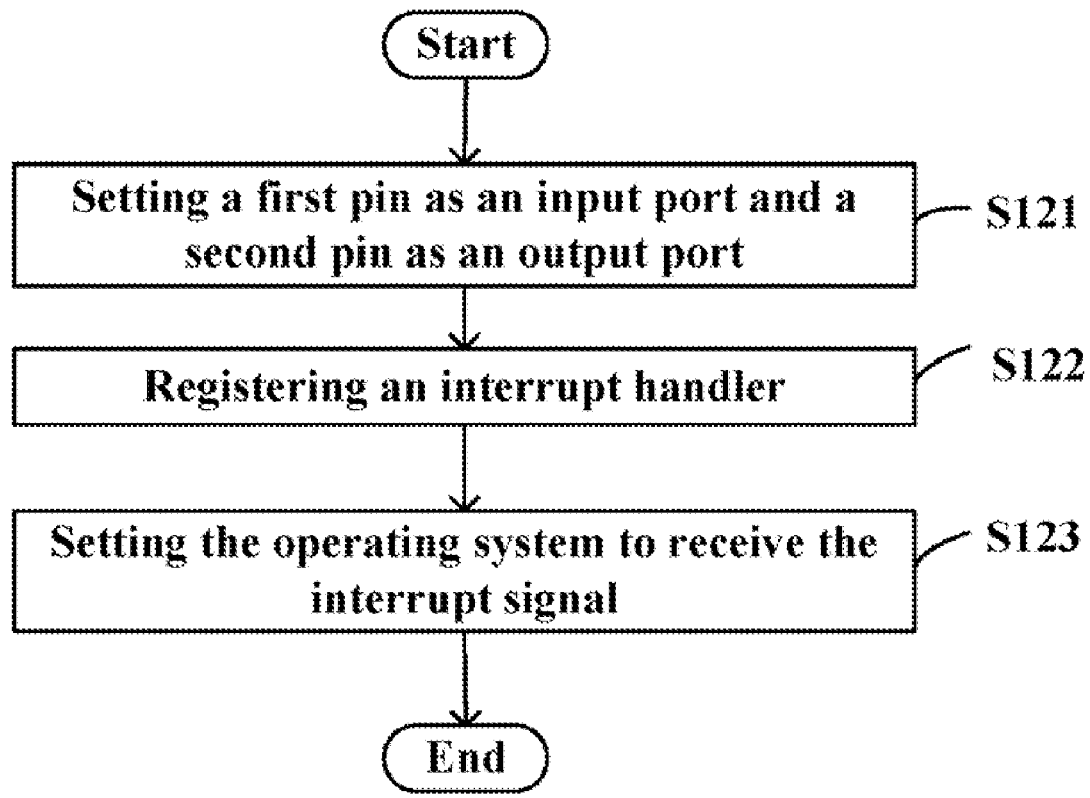
FIG. 4 is a flowchart of step S12 in FIG. 3, namely initializing GPIO system setting.

FIG. 4 is a flowchart of step S12 in FIG. 3, namely initializing GPIO system setting. Step S12 in FIG. 3 mainly includes the steps of: setting the first pin P1 as an input port, and setting the second pin P2 as an output port (Step S121); registering an interrupt handler as to assign a corresponding interrupt number (Step S122); setting the operating system to receive the interrupt signal (Step S123). Generally, the GPIO device 12 has twenty-six input port pins, and each of the pins has a corresponding interrupt number between 32 and 64. The interrupt number assigned to the interrupt handler should be the same as the interrupt number of the first pin P1 of the GPIO device 12. The interrupt handler includes a top half stack which is executed by preempting tasks of the kernel of the operating system and masking other interrupts, and a bottom half stack which is executed when the operating system is idled.

Figure 5:
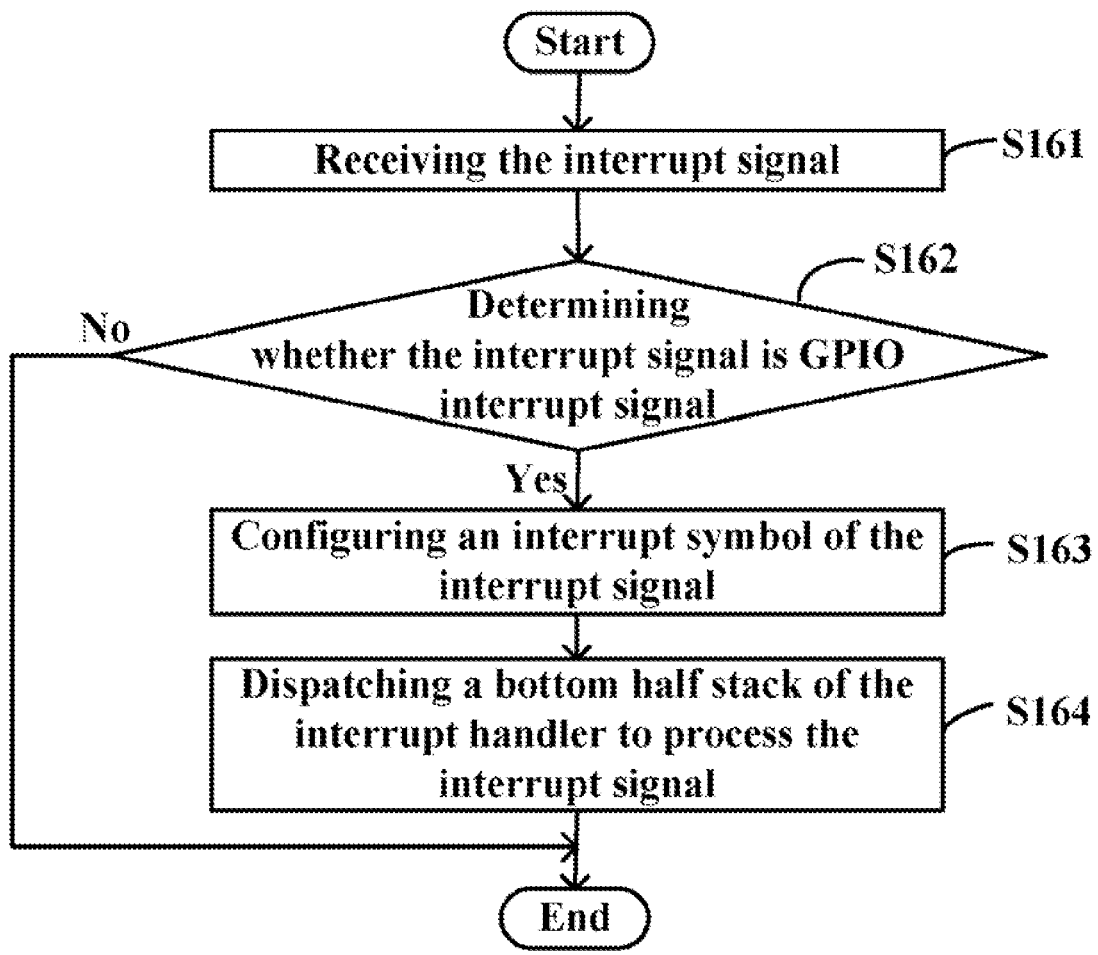
FIG. 5 is a flowchart of processing an interrupt signal by the top half stack of an interrupt handler.

FIG. 5 is a flowchart of processing the interrupt signal by the top half stack of an interrupt handler.

In step S161, the high voltage signal from the first pin P1 is read, and the interrupt signal is received.

In step S162, it is to determine whether the interrupt signal is GPIO interrupt signal. If the interrupt number of the interrupt signal is between 32 and 64, the interrupt signal is GPIO interrupt signal; otherwise, if the interrupt number of the interrupt signal is not between 32 and 64, the interrupt signal is not GPIO interrupt signal.

In step S163, an interrupt symbol of the interrupt signal is configured with a global variable N if the interrupt signal is GPIO interrupt signal. The initial value of the global variable N is zero.

In step S164, the bottom half stack of the interrupt handler is dispatched to process the interrupt signal.

If the interrupt signal is GPIO interrupt signal in step S162, the procedure ends.

Figure 6:
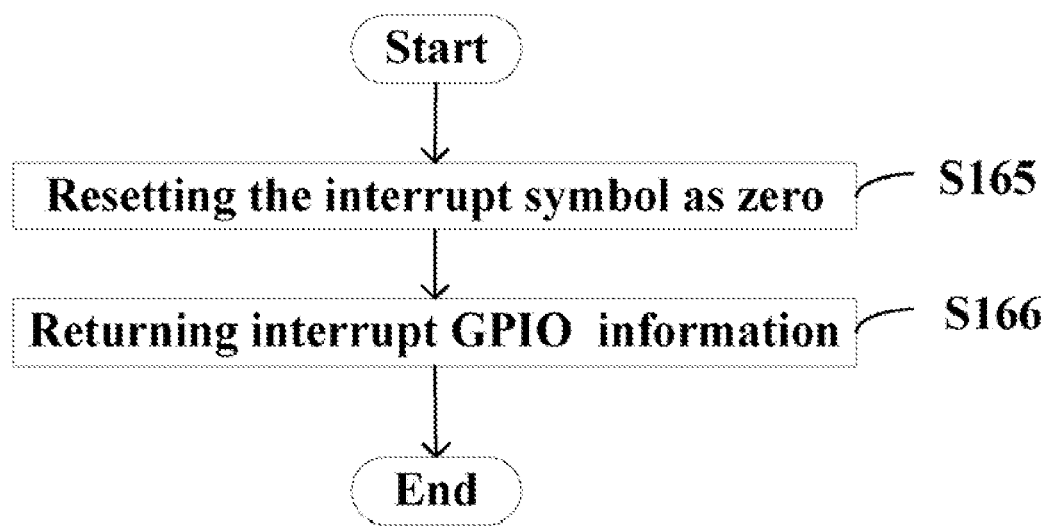
FIG. 6 is a flowchart of processing an interrupt signal by the bottom half stack of the interrupt handler.

FIG. 6 is a flowchart of processing the interrupt signal by the bottom half stack of the interrupt handler.

In step S165, the interrupt symbol N is reset as zero.

In step S166, interrupt GPIO information is returned to the application layer of the NAS, and then the procedure returns to step S15 to process the interrupt GPIO information.

It should be emphasized that the above-described embodiments of the preferred embodiments, particularly, any "preferred" embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. A method for restoring system configuration information of a network attached storage, the network attached storage comprises a general purpose input/output (GPIO) device, the GPIO device comprises a first pin, a power switch connected to the first pin, a light emitting diode (LED) connected to the power switch, and a second pin connected to the LED, the method comprising the steps of:
   setting system configuration information of the network attached storage as a backup file;
   registering an interrupt handler;
   pressing down an input key connected to the power switch to turn off the power switch and generate an interrupt signal in the first pin;
   invoking the interrupt handler to process the interrupt signal and returning interrupt GPIO information;
   determining whether an operating system of the network attached storage receives the interrupt GPIO information from the interrupt handler;
   sending a periodical voltage to the second pin for blinking the LED if the operating system receives the interrupt GPIO information from the interrupt handler;
   invoking the backup file to restore the system configuration information of the network attached storage; and
   sending a high voltage command to the second pin for powering off the LED, which indicates that the system configuration information has been restored.

2. The method according to claim 1, wherein the step of invoking the interrupt handler to process the interrupt signal and returning interrupt GPIO information comprises the steps of:
   processing the interrupt signal by executing a top half stack of the interrupt handler; and
   processing the interrupt signal by executing a bottom half stack of the interrupt handler.

3. The method according to claim 2, wherein the step of processing the interrupt signal by the top half stack of the interrupt handler comprises the steps of:
   receiving the interrupt signal;
   determining whether the interrupt signal is a GPIO interrupt signal; and
   configuring an interrupt symbol of the interrupt signal if the interrupt signal is a GPIO interrupt signal.

4. The method according to claim 3, wherein the step of processing the interrupt signal by the bottom half stack of the interrupt handler comprises the steps of:
   resetting the interrupt symbol as zero; and
   returning the interrupt GPIO information.

* * * * *